United States Patent
Keller

(10) Patent No.: US 12,456,379 B2
(45) Date of Patent: *Oct. 28, 2025

(54) QUICK-MOUNT WARNING RECEIVER

(71) Applicant: Raytheon Company, Arlington, VA (US)

(72) Inventor: Sean D. Keller, Tucson, AZ (US)

(73) Assignee: Raytheon Company, Arlington, VA (US)

( * ) Notice: Subject to any disclaimer, the term of this patent is extended or adjusted under 35 U.S.C. 154(b) by 370 days.

This patent is subject to a terminal disclaimer.

(21) Appl. No.: 18/074,164

(22) Filed: Dec. 2, 2022

(65) Prior Publication Data

US 2024/0185725 A1 Jun. 6, 2024

(51) Int. Cl.
| | |
|---|---|
| *G08G 5/21* | (2025.01) |
| *B64D 45/00* | (2006.01) |
| *G01J 1/02* | (2006.01) |
| *G01J 1/04* | (2006.01) |
| *G01J 1/42* | (2006.01) |
| *H01Q 3/08* | (2006.01) |

(52) U.S. Cl.
CPC ............... *G08G 5/21* (2025.01); *B64D 45/00* (2013.01); *G01J 1/0266* (2013.01); *G01J 1/0403* (2013.01); *G01J 1/4257* (2013.01); *H01Q 3/08* (2013.01)

(58) Field of Classification Search
CPC ......... G08G 5/21; B64D 45/00; G01J 1/0266; G01J 1/0403; G01J 1/4257; H01Q 3/08
USPC ........................................................ 340/945
See application file for complete search history.

(56) References Cited

U.S. PATENT DOCUMENTS

| | | | |
|---|---|---|---|
| 5,260,563 A | 11/1993 | Hunter et al. | |
| 5,525,989 A | 6/1996 | Holt | |
| 6,966,533 B1* | 11/2005 | Kalis | B60R 11/0241 |
| | | | 248/316.4 |
| 7,456,940 B2 | 11/2008 | Crow et al. | |
| 7,850,133 B2 | 12/2010 | Carnevali | |
| 7,975,971 B2 | 7/2011 | Carnevali | |
| 10,739,454 B2 | 8/2020 | Choiniere et al. | |
| 12,253,627 B2* | 3/2025 | Keller | G01S 17/88 |

(Continued)

FOREIGN PATENT DOCUMENTS

WO WO-2024118143 A1 6/2024

OTHER PUBLICATIONS

U.S. Appl. No. 17/961,185, filed Oct. 6, 2022, Quick-Mount Laser Warning Receiver.

(Continued)

*Primary Examiner* — Kerri L Mcnally
(74) *Attorney, Agent, or Firm* — Schwegman Lundberg & Woessner, P.A.

(57) ABSTRACT

A warning receiver can be detachably mounted on the inside of a window of a manned platform to detect RF or RF and laser threats and to provide visual or audio warnings to the human occupant. The warning receiver is fully self-contained and independent of any systems on the manned platform. In different packaging configurations, the receiver can be manually rotated to better visualize the threat and/or the receiver's human-machine interface (HMIF) can be manually rotated to better display the warnings. Although most typically used in manned aircraft the warning receiver can be used in other manned vehicles or ships.

19 Claims, 13 Drawing Sheets

(56) References Cited

U.S. PATENT DOCUMENTS

| | | | |
|---|---|---|---|
| 2001/0005804 A1* | 6/2001 | Rayner | B60R 1/12 |
| | | | 340/426.1 |
| 2004/0099775 A1 | 5/2004 | Zheng et al. | |
| 2011/0163897 A1 | 7/2011 | Russo et al. | |
| 2014/0104051 A1* | 4/2014 | Breed | G06V 20/56 |
| | | | 340/435 |
| 2016/0209266 A1 | 7/2016 | Mcneish | |
| 2018/0220049 A1* | 8/2018 | Yamada | H04N 23/51 |
| 2019/0094362 A1 | 3/2019 | Choiniere et al. | |
| 2024/0118388 A1 | 4/2024 | Keller | |

OTHER PUBLICATIONS

Chen, Wei Ting, et al., "Flat optics with dispersion-engineered metasurfaces", Nature Reviews Materials 5, (Jun. 19, 2020), 604-620.

Mei, Jin, "Laser Warning Receiver", National Air Intelligence Center (English Translation), (Aug. 20, 1996), 24 pgs.

"International Application Serial No. PCT US2023 034186, International Search Report mailed Jan. 30, 2024", 5 pgs.

"International Application Serial No. PCT US2023 034186, Written Opinion mailed Jan. 30, 2024", 10 pgs.

"U.S. Appl. No. 17/961,185, Restriction Requirement mailed Mar. 13, 2024", 6 pgs.

"U.S. Appl. No. 17/961,185, Response filed Apr. 17, 2024 to Restriction Requirement mailed Mar. 13, 2024", 7 pgs.

DE 112010002799T5 machine translation, (2012).

"U.S. Appl. No. 17/961,185, Non Final Office Action mailed Jun. 10, 2024", 9 pgs.

"U.S. Appl. No. 17/961,185, Notice of Allowance mailed Nov. 12, 2024", 9 pgs.

"U.S. Appl. No. 17/961,185, Response filed Aug. 27, 2024 to Non Final Office Action mailed Jun. 10, 2024", 12 pgs.

\* cited by examiner

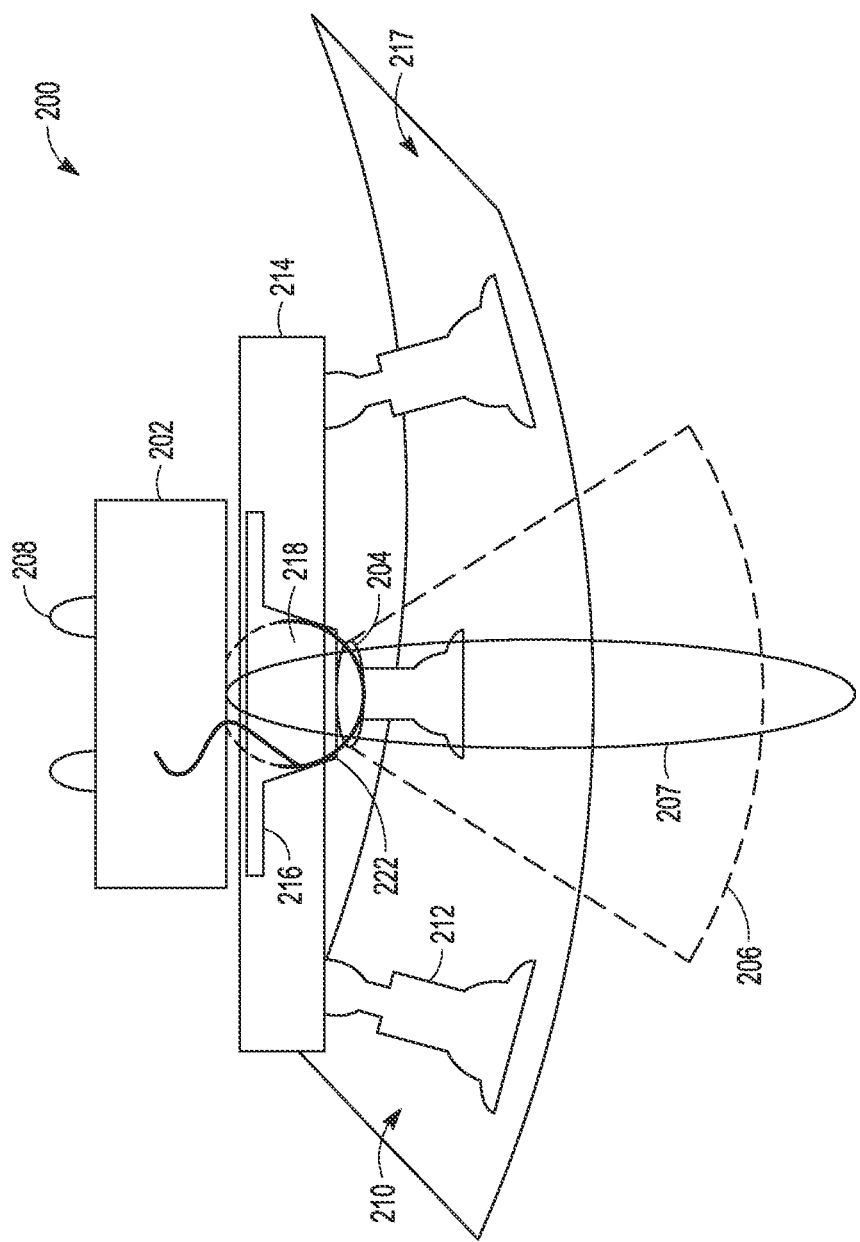

QUICK-MOUNT WARNING RECEIVER

BACKGROUND

Field

This disclosure relates to warning receivers and more specifically to a warning receiver package that can be quickly and reliably mounted to the flat or curved inner surface of a window of a manned platform and oriented to detect RF or laser threats and to display warnings to the occupant.

DESCRIPTION OF THE RELATED ART

An emerging threat to both commercial and military aircraft is the individual on the ground with a laser pointer that feels compelled to direct the laser beam through the cockpit window. The laser is typically a continuous wave (CW) laser in the visible (e.g., green) or NIR/SWIR bands. The laser can distract the pilots and possible cause permanent eye damage. Aircraft are particularly susceptible to this threat during takeoff and landing. Currently, there are no affordable laser warning receivers that can be retrofit to commercial or military aircraft to effectively detect this specific threat.

Another emerging threat to both commercial and military aircraft is a ground or air-based RF threat that illuminates the aircraft including through the cockpit or other apertures. The RF threat is typically pulsed. Currently, there are no affordable RF warning receivers that can be retrofit to commercial or military aircraft to effectively detect this specific threat.

SUMMARY

The following is a summary that provides a basic understanding of some aspects of the disclosure. This summary is not intended to identify key or critical elements of the disclosure or to delineate the scope of the disclosure. Its sole purpose is to present some concepts of the disclosure in a simplified form as a prelude to the more detailed description and the defining claims that are presented later.

The present disclosure provides a warning receiver that can be detachably mounted on the inside of a window of a manned platform to detect RF or RF and laser threats and to provide visual or audio warnings to the human occupant. The warning receiver is fully self-contained and independent of any systems on the manned platform. In different packaging configurations, the receiver can be manually rotated to better visualize the threat and/or the receiver's human-machine interface (HMIF) can be manually rotated to better display the warnings. Although most typically used in manned aircraft the warning receiver can be used in other manned vehicles or ships.

In an embodiment, a warning receiver includes a forward-facing RF antenna having an antenna pattern to detect RF threats and a rearward-facing HMIF to provide visual or audio warnings of the detected RF threat to a human occupant. A quick release mechanism is configured to mount the warning receiver to a flat or curved surface of window to receive RF through the window. The RF antenna may, for example, be a patch, horn, dipole or loop antenna, may be positioned parallel to or at a bias angle to the window, it may have a narrow or wide antenna pattern, and it may be pointed either mechanically or electronically.

The quick release mechanism may include one or more feet. For multiple feet, each foot is suitably rotatable coupled to the warning receiver such as via a ball joint to accommodate mounting to a curved surface. Each foot may be, for example, a lockable suction cup, Velcro, a magnet or other attachable/detachable mechanism.

The quick release mechanism may further a rotational coupler configured to provide one, two or 3-axis rotation of the warning receiver to point the RF antenna's antenna pattern. The manual rotation of the antenna pattern and the HMIF may be rigidly coupled or independent of each other. The rotation may occur in a single axis such as circular rotation about the viewing axis (e.g., the z-axis normal to the window) or in multiple axes to point the antenna pattern or HMIF up/down (e.g., about the x-axis) or left/right (e.g., about the y-axis). Cylindrical rotation may be provided by forming complementary patterns of locking features (e.g., teeth) on the warning receive and on a stationary device platform mounted via the 1, 2 or 3 feet. Full 3-axis rotation may be provided by a ball joint or by the combination of a single foot, a cantilevered arm and cylindrical rotation.

The warning receiver may include RF electronics configured for a particular band (e.g., L, S, C, X, S, Ku, K or Ka) supported by the RF antenna or may include a common optical backend including an optical detector and E/O electronics that span the entire spectrum from L to Ka band. The later having the advantage that the same backend can be used in warning receivers configured for different particular bands.

The warning receiver may further include a forward-facing optical aperture having a field-of-view (FOV) and an optical detector mounted to receive light within the FOV and provide visual or audio warnings the HMIF of a detected laser source. In one configuration, the optical backend can be configured to detect both the laser sources and RF threats. The warning receiver may be configured to detect continuous wave (CW) and pulsed laser sources in the visible or NIR/SWIR bands and pulsed RF sources. The rotational coupler may be configured to point both the antenna pattern and FOV using cylindrical or a full 3-axis of rotation.

These and other features and advantages of the disclosure will be apparent to those skilled in the art from the following detailed description of preferred embodiments, taken together with the accompanying drawings, in which.

BRIEF DESCRIPTION OF THE DRAWINGS

FIGS. 7A-7B illustrate different embodiments of a quick-mount release mechanism in which an optical ball joint is centrally located on a device platform to point the optical FOV and RF antenna pattern with the RF antenna being position on the warning receiver outside the optical path or formed as an optically transparent coating on the optical ball joint, respectively;

DETAILED DESCRIPTION

The present disclosure provides a warning receiver that can be detachably mounted on the inside of a window of a manned platform to detect RF or RF and laser threats and to provide visual or audio warnings to the human occupant. The warning receiver is fully self-contained and independent of any systems on the manned platform. In different packaging configurations, the receiver can be manually rotated to better visualize the threat and/or the receiver's human-machine interface (HMIF) can be manually rotated to better display the warnings. Although most typically used in manned aircraft the warning receiver can be used in other manned vehicles or ships.

Figure 1:
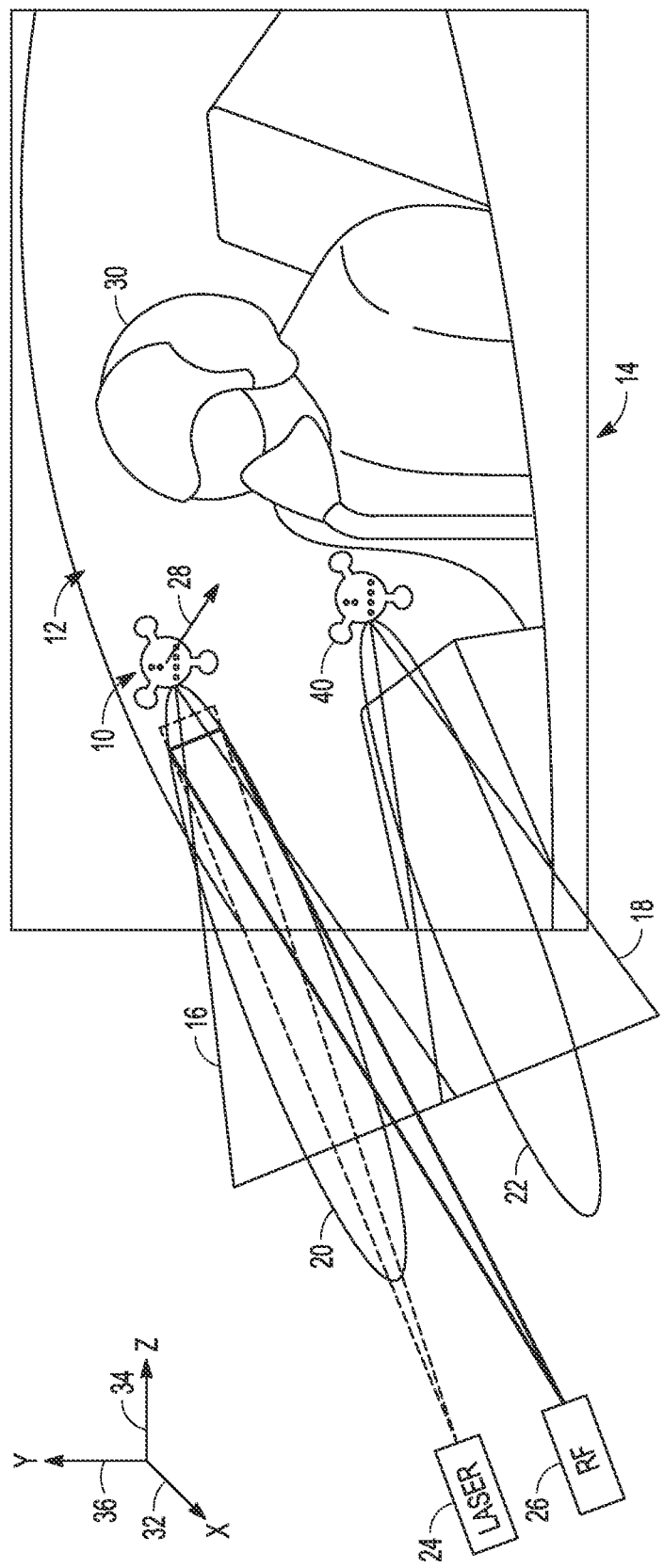
FIG. 1 is an illustration of a quick-mount warning receiver mounted inside the cockpit of a manned aircraft to detect RF or laser threats.

Referring now to FIG. 1, in a representative application a pair of warning receivers 10 are mounted on an inner surface of a cockpit window 12 of a manned aircraft 14 to provide optical FOV 16 and 18 and RF antenna patterns 20 and 22, typically but not necessarily overlapping, to detect threats from a laser source 24 or an RF source 26 and to provide visual or audio warnings 28 to a human occupant (e.g., the pilot) 30. Each FOV, for example, may be between +/−30 to +/−90 degrees in two directions to provide between 60 and 180 degrees of coverage full-field per sensor. The antenna pattern refers to the directional (angular) dependence of the strength of RF from (or to) the antenna within the warning receiver. An antenna pattern will typically include a main lobe in a desired direction of propagation (or receipt) of RF. Other lobes are called sidelobes and usually represent radiation in unwanted directions. Directivity is a parameter of an antenna that measures the degree to which the radiation emitted (or received) is concentrated in a single direction (e.g., the desired direction of the main lobe). Directivity is the ratio of the radiation in the given direction from the antenna to the radiation intensity averaged over all directions. The antenna pattern may have a narrow highly directional main lobe or may have a wide minimally directional main lobe.

Each warning receiver 10 may include the capability to rotate (point) the optical FOV and RF antenna pattern to better receive the threat (laser source 24 or RF source 26) or to rotate (orient) the HMIF towards the pilot 30 as desired such that a single design can be used on multiple different platforms with multiple different window shapes and slopes to address multiple different threats, ground vs air-based, takeoff and landing only vs all phases of flight, etc. The rotation capability may be limited to cylindrical rotation about the X-axis 32 (surface normal to the window) or may provide rotation about the Z-axis 34 to tip the FOV up/down or may provide rotation about the Y-axis 36 to tip the optical FOV and RF antenna pattern left/right or preferably provide rotation about all 3 axes. The HMIF may be rigidly coupled to the forward-facing apertures such that they rotate in the same manner. Alternately, the optical FOV or RF antenna pattern could be fixed and the HMIF allowed to rotate or multiple coupling mechanisms could be provided to allow for independent pointing of the optical FOV/RF antenna pattern and orientation of the HMIF. In general, the rotational coupling can provide 360 degrees of cylindrical rotation and approximately 20-30 degrees of rotation about the X and Y axis as constrained by limitations of the mount e.g., spacing of the aperture to the window, spacing between the aperture and the mount, etc. The capability designed into warning receiver 10 will depend on the platform (e.g., slope of the window), nature of the threat and SWAP-C requirement.

The warning receiver is fully self-contained (e.g., own power source, electronics, human-machine interface) and independent of any systems on the manned platform. The warning receiver includes a quick release mechanism 40 (adapted for mounting on either a flat or curved surface) that allows the pilot to position each warning receiver 10 as best suited to detect the threat based at least in part on the nature of the threat, the slope of window 12, other instrumentation in the cockpit and pilot preference. The nature of the threat may, for example, be limited to only a person on the ground with a laser pointer (e.g., a continuous wave (CW) source in the visible or NIR/SWIR bands). This threat is most pervasive during takeoff or landing. Alternately, the threat may be a rangefinder or guidance beam for a weapons system, typically pulsed. The threat could also be a ground or air-based CW or pulsed RF source. The pointing of the optical FOV/RF antenna pattern can be adjusted in-flight, if desired, based suspected threat locations. Warning receiver 10 may be configured to detect and warn based on either threat and to provide warnings that characterize or identify the threat and to possible locate the threat. Detection and possible characterization or location of the threat sources may allow the pilot to don aircrew laser eye protection (ALEP), activate sensor protection, to radio the source characterization or location information to address the threat or to take evasive action or deploy countermeasures.

This attachable/detachable self-contained warning receiver 10 provides much needed laser or RF threat detection capability for both commercial and military aircraft. The Size, Weight and Power—Cost (SWAP-C) of the warning 10 is highly favorable when compared to the cost and complexity of implementation or retro-fit of dedicated laser or RF receivers mounted around the aircraft that feed data to a central computer that presents warnings via a hard-wired system in the cockpit. The warning receiver 10 is simple and easy to use.

Figure 2:
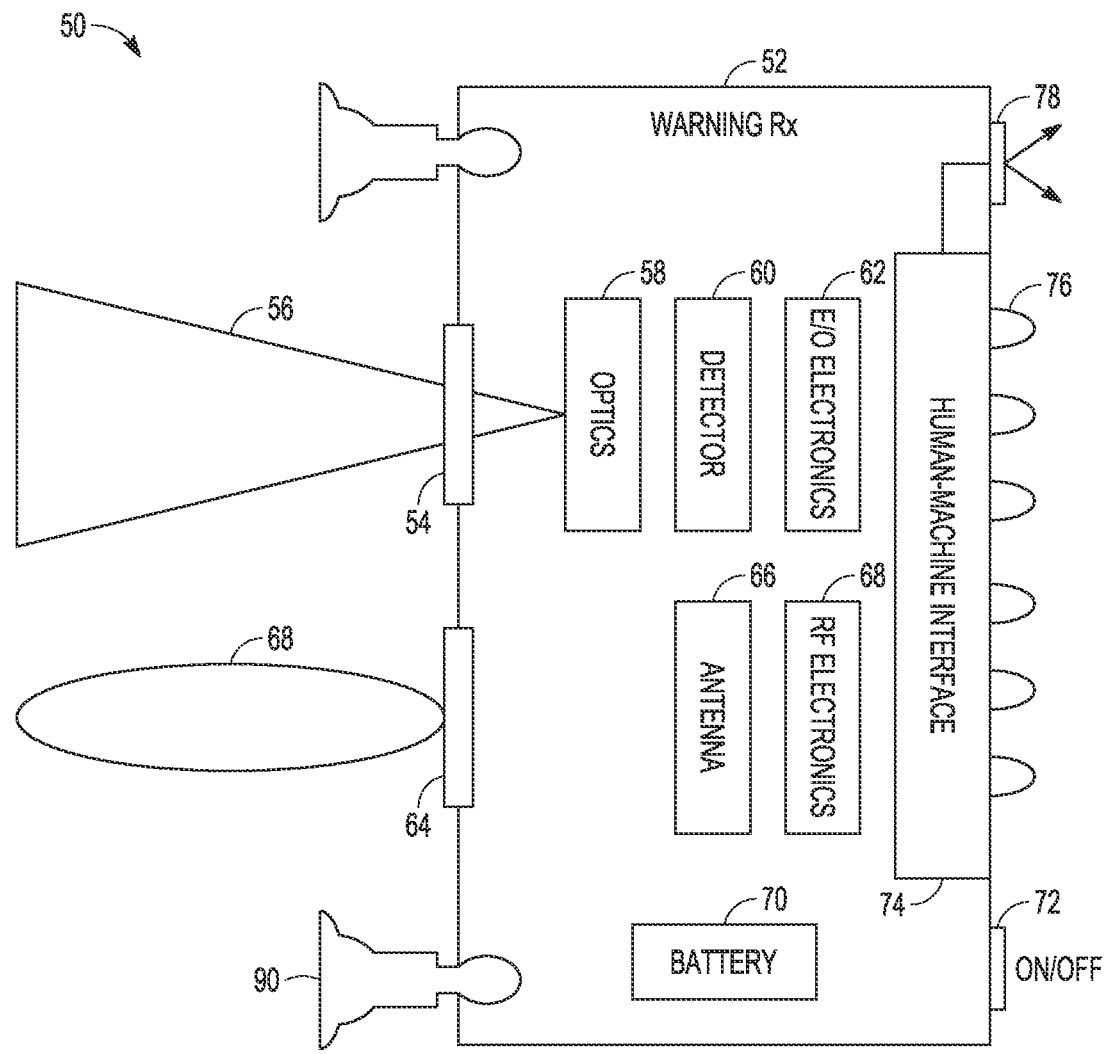
FIG. 2 is a block diagram of an embodiment of an RF/laser warning receiver.

Referring now to FIG. 2, in an embodiment a self-contained quick-mount RF/laser warning receiver 50 includes a warning receiver 52 having an optical channel including a forward-facing optical aperture 54 with an optical FOV 56, optics 58, an optical detector 60 (e.g., single pixel, quadrant detector, linear array or two-dimensional imaging array) and E/O electronics 62 configured to detect the presence of a laser source within optical FOV 56, an RF channel including a forward-facing RF aperture 64 (e.g., the absence of any conductors in an RF path), an RF antenna 66 with an antenna pattern 68 and RF electronics configured to detect the presence of an RF source within the main lobe of RF antenna pattern 66, a battery 70, an on/off button 72 and a rearward-facing human-machine interface (HMIF) 74 configured to provide visual warnings via LEDs 76 or audio warnings via a speaker 78. These warnings may include device status (battery level), threat detected, threat characterization or threat location. The optics/detector/electronics may, for example, be of the type described in U.S. Pat. No. 7,456,940 B2 entitled "Methods and Apparatus for Locating and Classifying Optical Radiation" or co-pending U.S. patent application Ser. No. 17/411,859 entitled "Warning Receiver for Detecting and Characterizing an Optical Source" filed Aug. 25, 2021 as well as many other configurations of the warning receiver itself depending on whether it is configured to detect only CW, only pulsed or both, and for various bands and whether the warning receiver is configured to provide only a warning or to provide additional information such as threat characterization or location Antenna 66 may be configured to detect RF sources within a specific band (e.g., the X band) of the spectrum from, for example, L to the Ka bands. The RF electronics 68 are designed for that specific band (e.g., the X band). A quick release mechanism 80 is coupled to warning receiver 52 for mounting the warning receiver 52 to a flat or curved inner surface of a transparent window of a manned platform to position the forward-facing apertures to receive light within the FOV 56 and RF within the antenna pattern 68 through the optically and RF transparent window and to provide visual or audio warnings of a detected laser or RF source to the human occupant. An RF only warning receiver may be configured without the optical channel.

Alternately, an RF/laser warning receiver may use a common optical backend including an optical detector and E/O electronics that span the entire spectrum from L to Ka band to process both the laser and RF threats. One advantage of this common optical backend is that because it spans the entire spectrum L to Ka bands it does not have to be redesigned for a particular RF antenna within the spectrum.

Figure 3A:
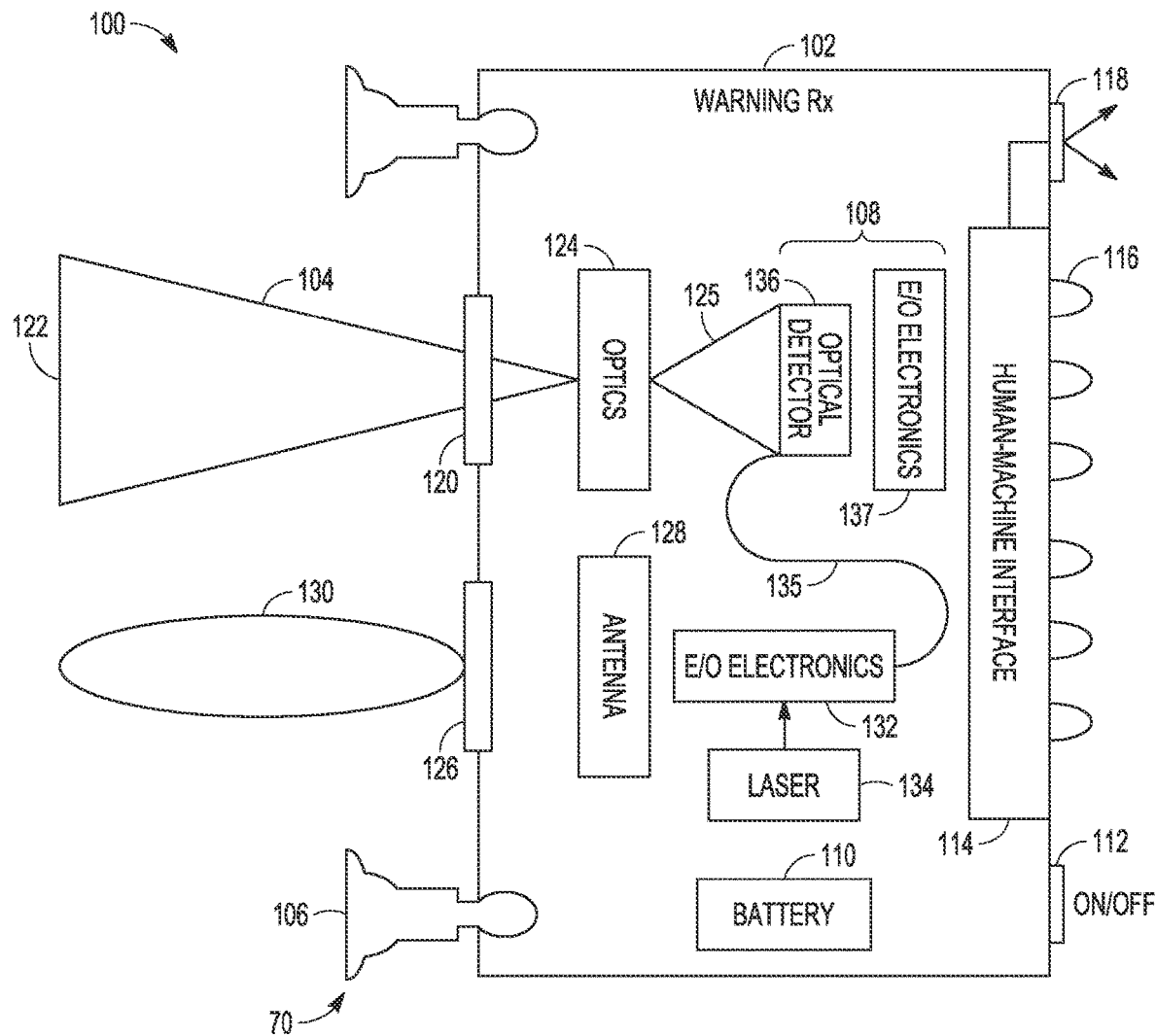
FIGS. 3A and 3B are a block diagram and optical readout of an embodiment of an RF/laser warning receiver using a common optical backend.
Figure 3B:
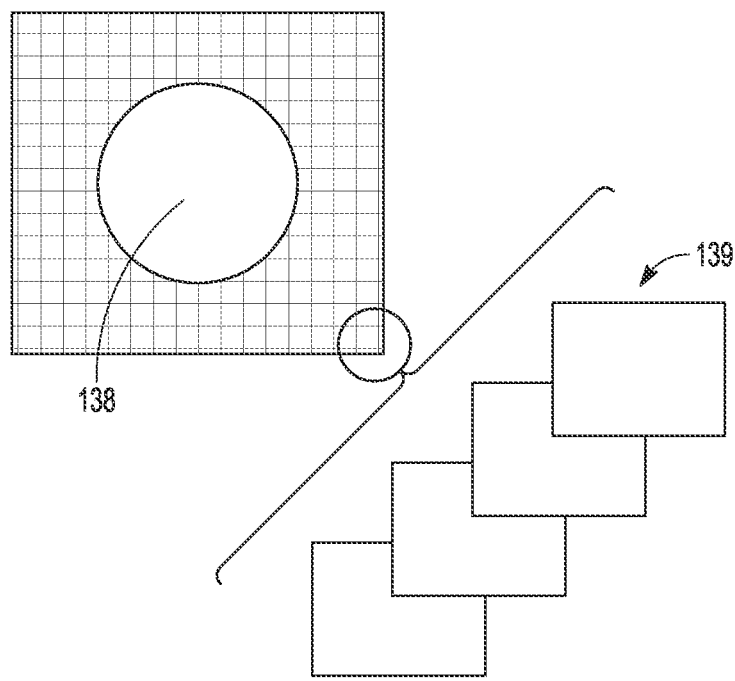

Referring now to FIGS. 3A and 3B, in an embodiment a self-contained quick-mount RF/laser warning receiver 100 includes a warning receiver 52 having an optical input channel 104, an RF input channel 106 and a common optical backend 108 configured to detect the presence of laser or RF threats, a battery 110, an on/off button 112 and a rearward-facing HMIF 114 configured to provide visual warnings via LEDs 116 or audio warnings via a speaker 118, which may include device status (battery level), threat detected, threat characterization or threat location.

Optical input channel 104 includes a forward-facing optical aperture 120 with an optical FOV 122 and optics 124 to receive and form incident light 125. RF input channel 106 includes a forward-facing RF aperture 126, an RF antenna 128 with an antenna pattern 130, an E/O modulator 132 and a seed laser 134 to receive RF radiation and convert it to light 135. The particular RF frequency or band appears as an offset to the seed laser frequency.

Common optical backend 108 includes a pixelated optical detector 136 and E/O electronics 137. Light 125 from the optical input channel 104 is spatially coupled to a plurality of pixels on pixelated optical detector 136. Light 135 from the RF input channel 106 is coupled to one or more (suitably just one) pixel on pixelated optical detector 136. Light 125 may, for example, form a spot 138 on pixelated optical detector 136 indicating the presence of a laser source in optical FOV 122. Light 135 may, for example, be read out from a single pixel over one or more time samples 139 indicating the presence (or absence) of an RF source within antenna pattern 130. E/O electronics 137 have sufficient bandwidth to process RF across the entire spectrum from the L to Ka bands.

An RF only warning receiver may be configured without the optical input channel but still use the optical backend to process the received RF radiation. In this manner, different RF only warning receivers whose antennas are configured for different RF bands can use the same common optical backend.

Figure 4A:
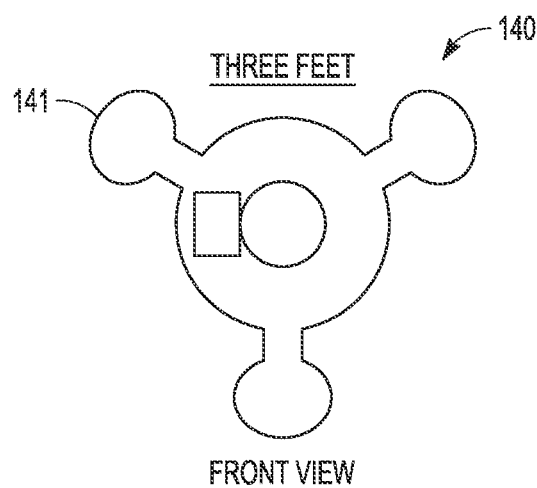
FIGS. 4A-4C are front, back and side views of an RF/laser warning receiver in which the quick release mechanism includes three suction cup feet.
Figure 4B:
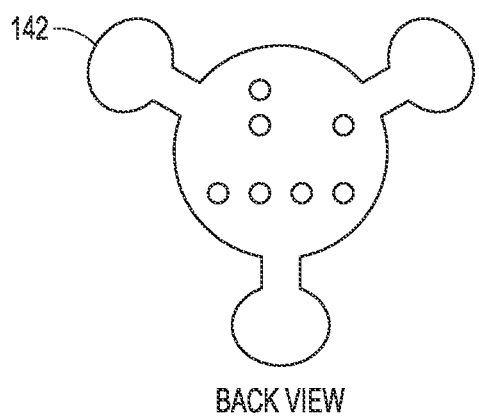
Figure 4C:
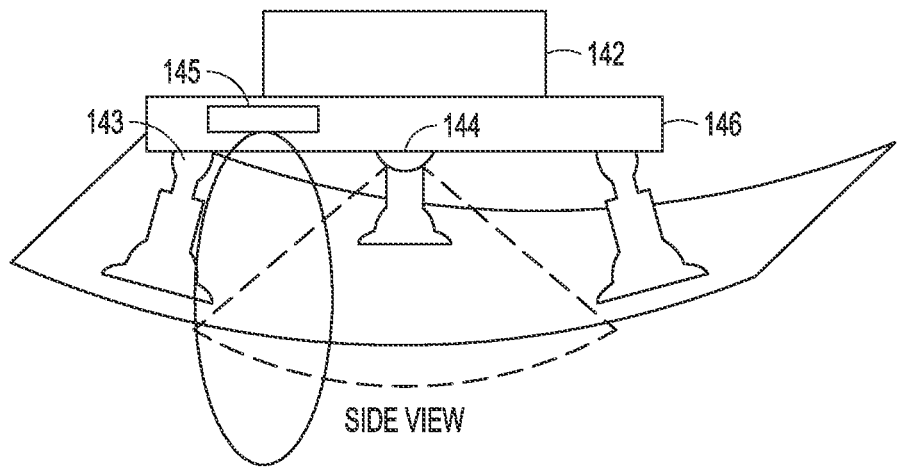

Referring now to FIGS. 4A-4C, an embodiment of a quick release mechanism 140 includes 3 feet 141 coupled to an RF/laser warning receiver 142 The "feet" may be, for example, lockable suction cups such as RAM® Mounts Twist-Lock™, Velcro, or magnets. In the cases of 2 or 3 feet, each foot 141 is rotationally coupled to the warning receiver 142 by, for example, a ball joint 143 to provide rotation about 3 axes to facilitate mounting on a curved surface. The ball joint is not necessary for flat surfaces. The warning receiver's forward-facing optical aperture 144 is suitably positioned at the center of the 3 feet but may be located elsewhere based on internal packaging constraints. The RF antenna 145 is positioned outside of the optical path. As depicted, the feet 141 are coupled to a stationary device platform 146 on which the warning receiver 142 is mounted with a clear aperture through the platform. The ball joints 143 may be discrete or integrally formed with platform 146. The number and configuration of feet 141 may be determined by requirements to balance the warning receiver 142 or to limit vibration and the size and weight of the warning receiver.

Figure 5:
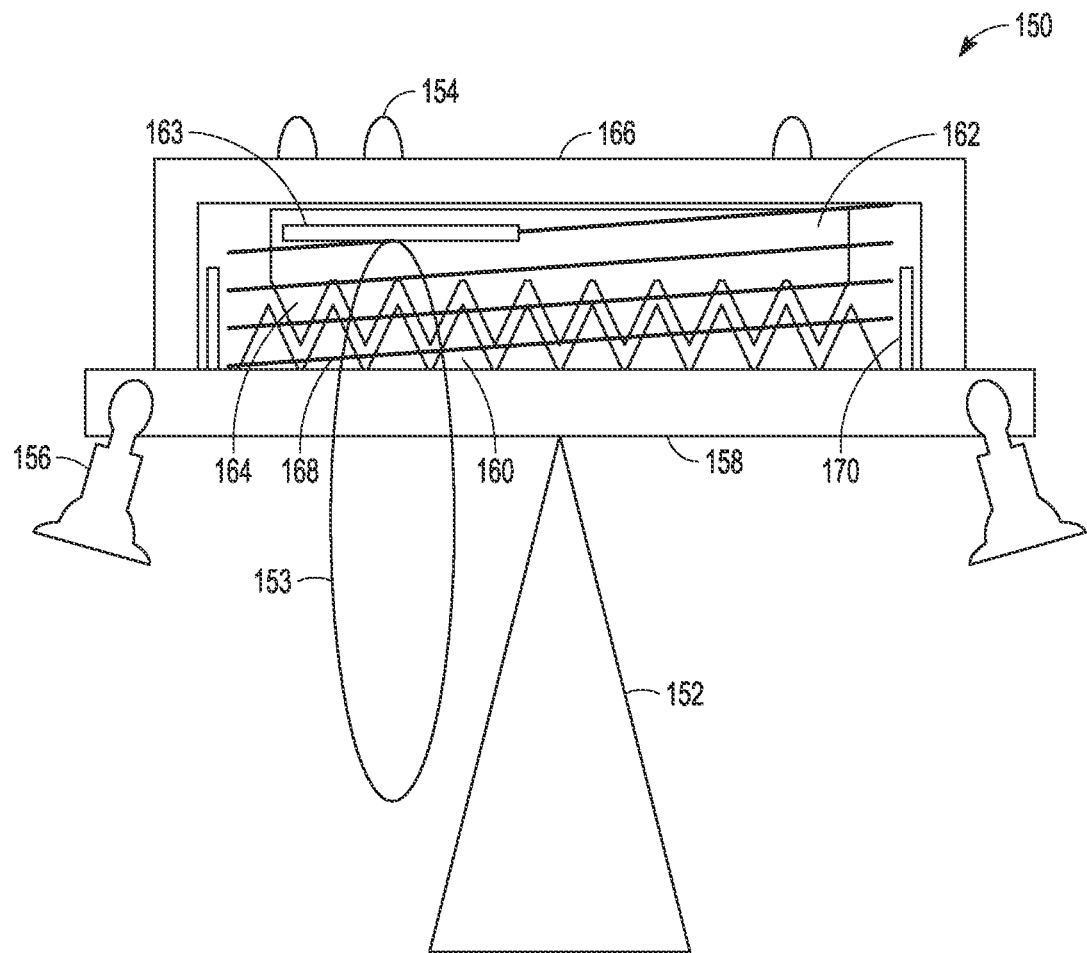
FIG. 5 is a section view of an embodiment of an RF/laser warning receiver configured to provide cylindrical rotation of the optical FOV and RF antenna pattern.

Referring now to FIG. 5, a self-contained quick-mount RF/laser warning receiver 150 is configured to provide cylindrical rotation of a sensor body 162, which includes the optics/optical detector/E/O electronics and RF antenna 163, and HMIF 154. Most typically, this capability would be used by the pilot to orient the HMIF 154 in a preferred direction so that it is more readily visible to the pilot. However, cylindrical rotation can be used to properly point the optical FOV 152 and RF antenna pattern 153. In this embodiment, a pair of feet 156 are coupled to a stationary device platform 158 formed with locking features (e.g., teeth) 160. Rotational sensor body 162 is formed with complementary locking features (e.g., teeth) 164 and provided with a housing cap 166. A tension spring 168 couples sensor body 162 to stationary device platform 158 and a retention guide 170 to ensure the sensor body 162 does not shift laterally during extension, thereby keeping the locking teeth 164 and 160 aligned. The pilot can attach the warning receiver 150 with an arbitrary orientation, lift housing cap 166 to disengage the complementary locking features, rotate the HMIF 154 about the surface normal (Z-axis) to the desired orientation (90 degrees as shown), and replace the housing cap 166 to engage the complementary locking features.

Figure 6:
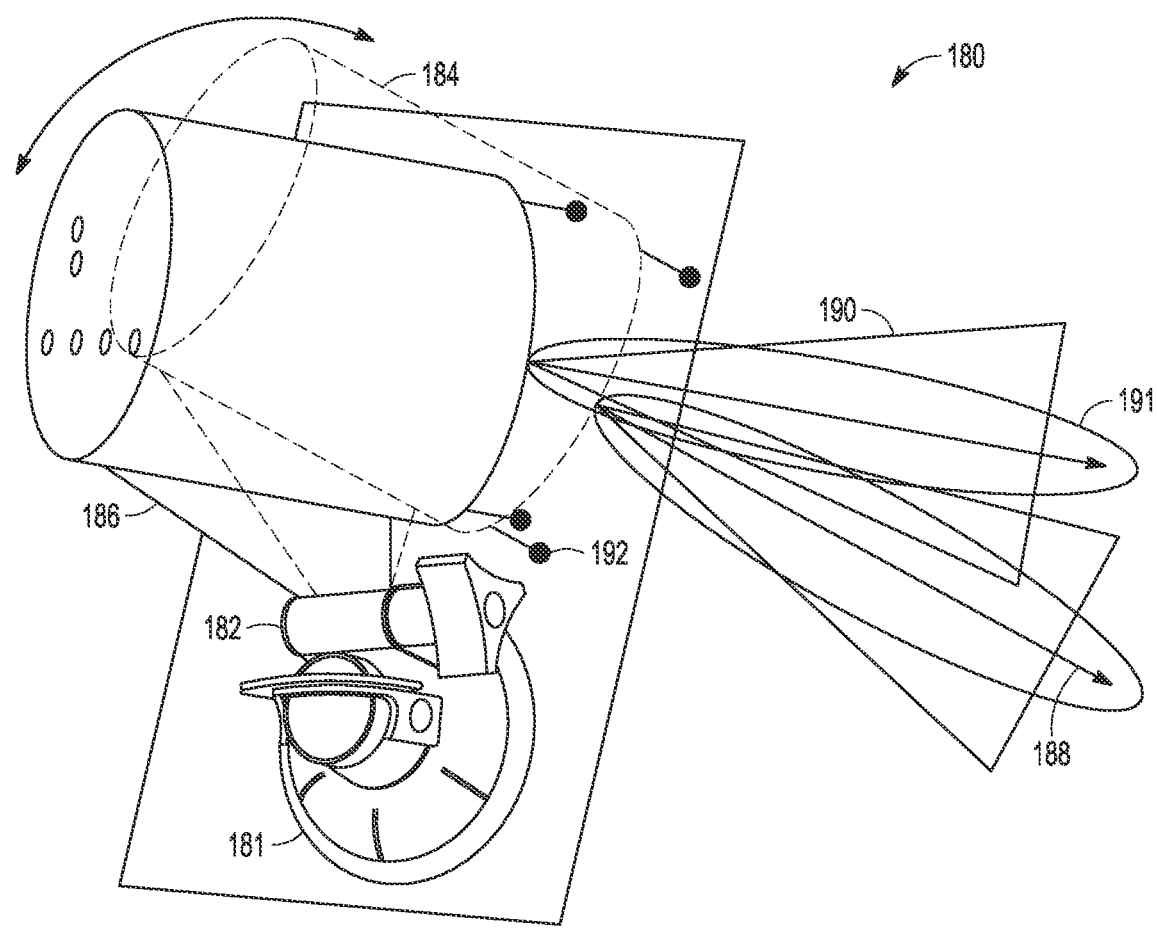
FIG. 6 illustrates an embodiment of an RF/laser warning receiver and quick-mount release including a cantilevered arm.

Referring now to FIG. 6, a self-contained quick-mount warning receiver 180 includes a single lockable suction cup 181 that includes a lockable rotatable mount 182. An RF/laser warning device 184 is attached via a cantilever arm 186 to rotatable mount 182. Cantilever arm 186 can be rotated to point an axis 188 of an optical FOV 190, and hence an RF antenna pattern 191. Adjustable feet 192 may be provided to stabilize the warning receiver 180. The feet may contain smaller suction cups, adhesive, or other features to help minimize jitter. A second axis of rotation can be provided by incorporating the cylindrical rotation design depicted in FIG. 5. A third axis of rotation can be provided by manually rotating the suction cup 181.

Figure 7A:
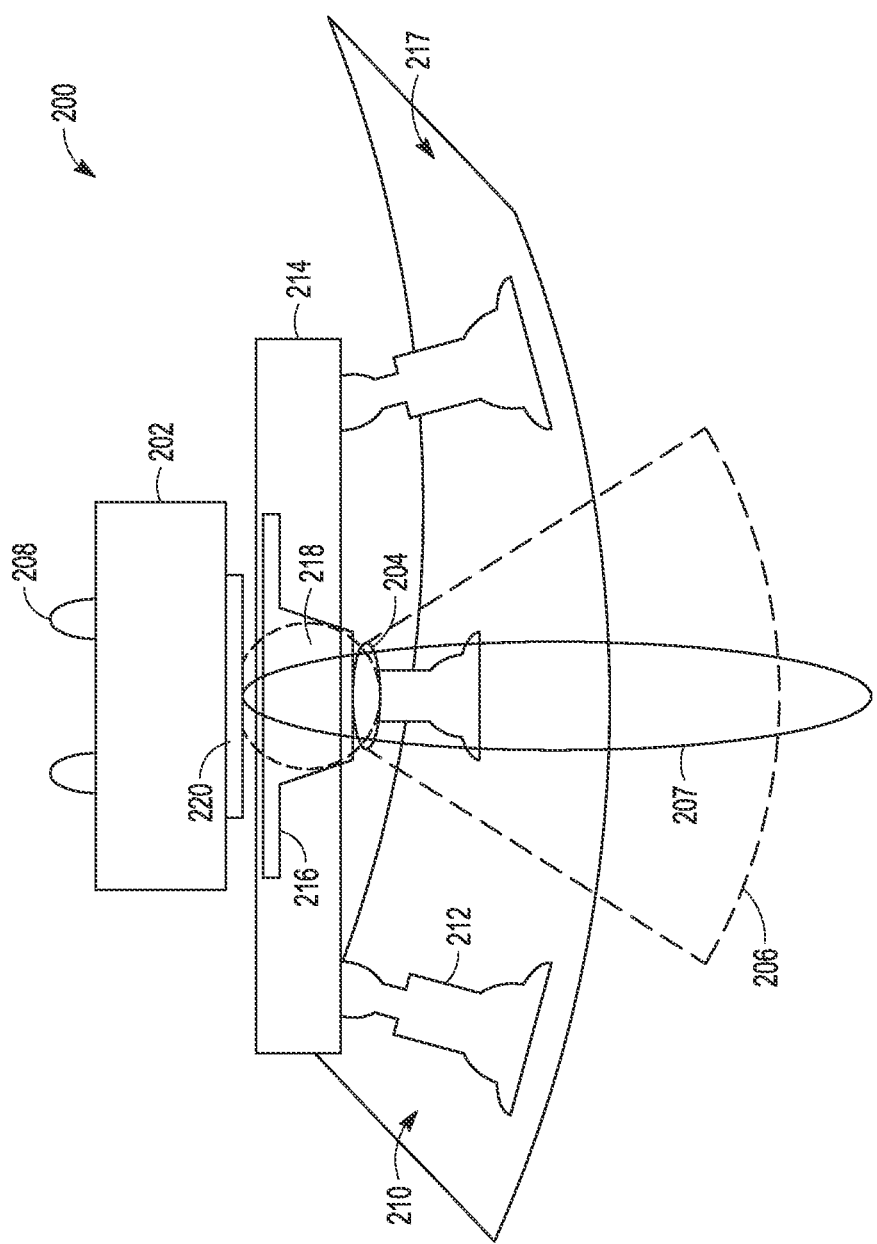

Referring now to FIGS. 7A and 7B, a self-contained quick-mount RF/laser warning receiver 200 includes a warning receiver 202 having a forward-facing aperture 204 with an optical FOV 206 and an RF antenna pattern 207 and a rearward-facing HMIF 208. A quick release mechanism 210 includes at least two feet 212 rotatably coupled to a stationary device platform 214 including a ball joint interface 216 (suitably positioned in the center of the feet) for mounting to a flat or curved inner surface 217 of an optically transparent window. An optical ball joint 218 is positioned in the ball joint interface 216 to rigidly and optically couple the forward-facing aperture 204 to the warning receiver 202. The optical ball joint may, for example, be a solid glass ball or a spherical shell with lenses placed in cut outs on the top and bottom of the shell. The optical ball joint is configured to manually rotate the warning receiver 202 to point the FOV. As shown in FIG. 7A, a patch antenna 220 is positioned on warning receiver 202 outside of the optical path to the optical detector. As shown in FIG. 7B, a conductive optically transparent coating 222 such as Indium-Tin-Oxide (ITO) is formed on the optical ball joint 218, preferably on the underside of the optical ball joint, to define the RF antenna.

Figure 8:
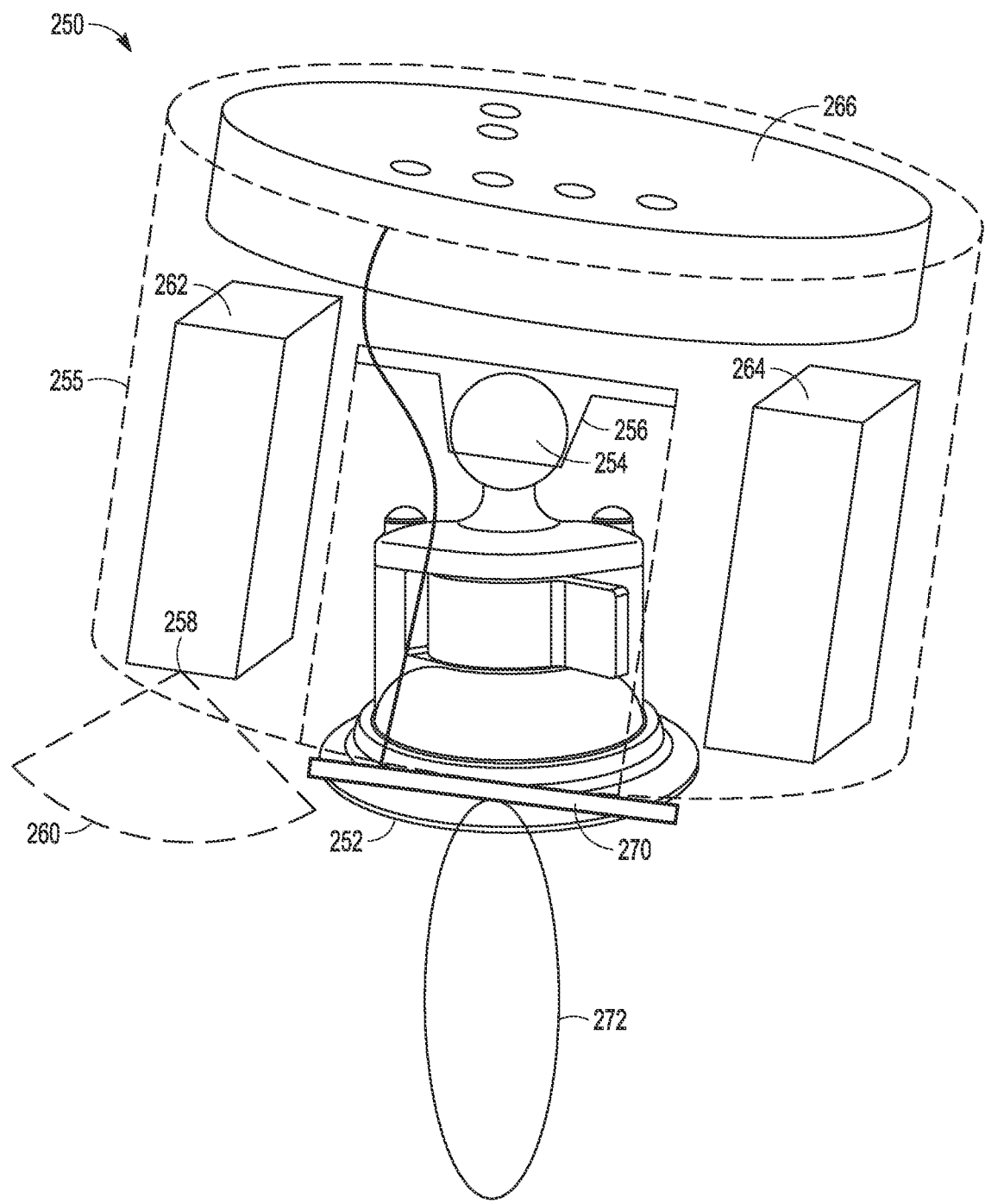
FIG. 8 illustrates an embodiment of an RF/laser warning receiver in which the quick-mount release mechanism includes a single suction cup in which the RF antenna is formed and a mechanical ball joint on which the optical FOV is rotatably coupled.
Figure 9:
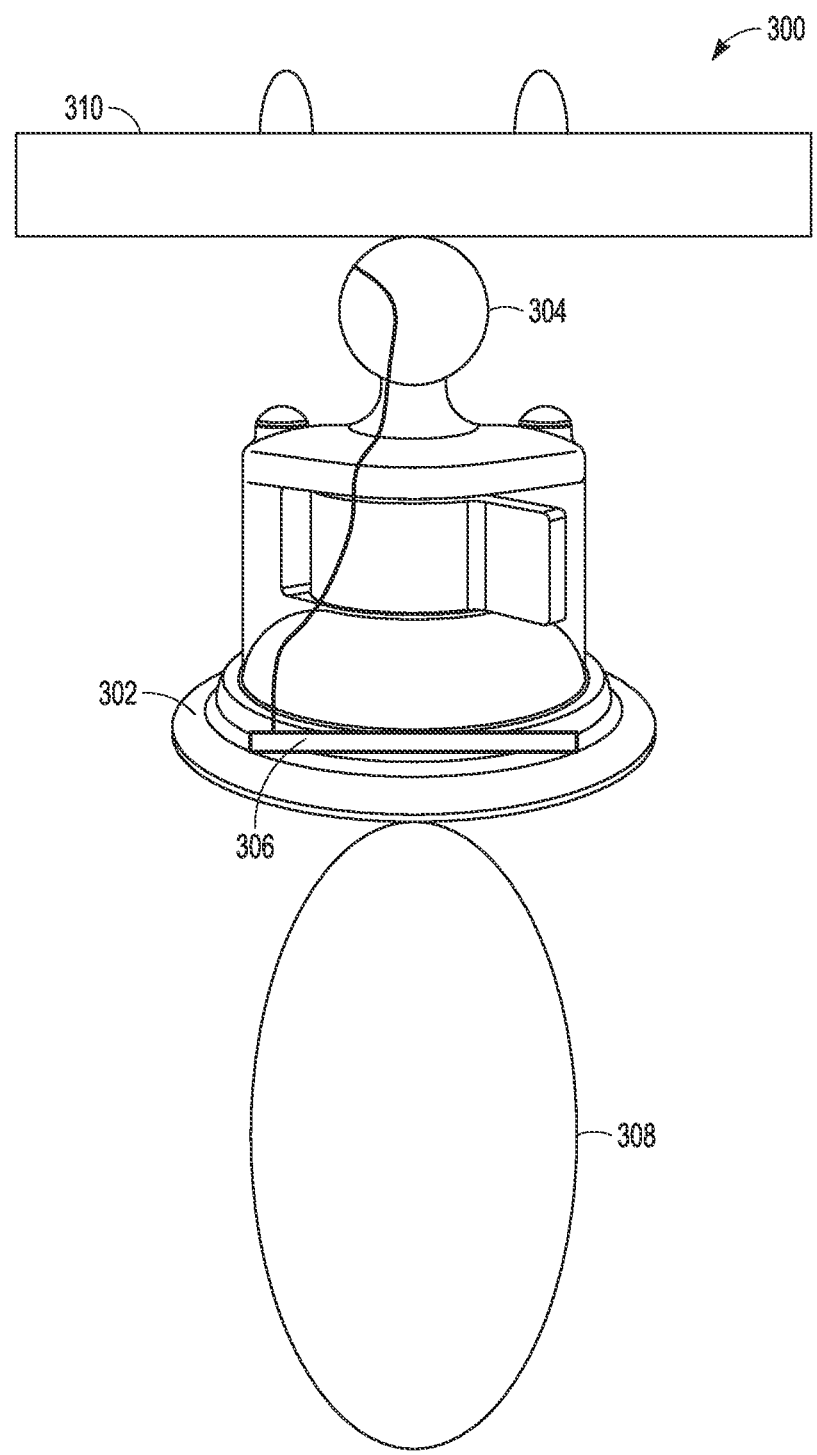
FIGS. 9 and 10A-10D illustrate an embodiment of an RF warning receiver in which the RF antenna is positioned inside a single suction cup and various implementations of the RF antenna patterns.

Referring now to FIG. 8, a self-contained quick-mount RF/laser warning receiver 250 includes a single lockable suction cup 252 having a centrally located mechanical ball joint 254. A device package 255 includes a ball joint interface 256 that engages mechanical ball joint 254. The warning receiver's forward-facing optical aperture 258 is offset and positioned outside the footprint of the single lockable suction cup 252. The warning receiver's optical FOV 260 can be rotated about the axis through the suction cup (the Z-axis) or about the X and Y axes. Within device package 255, an optical detector 262 is suitably offset with the aperture 258 to receive laser light in FOV 260 and the battery 264 is offset in the other direction to provide balance. The electronics and HMIF 266 are mounted on the rear facing side of the ball joint interface 256. The exact locations of the battery 264, electronics within the HMIF 266, and optical detector 262 can be moved to balance the system and fit necessary components within the device package 255. An RF antenna 270 is positioned inside the single lockable suction cup 252 and coupled to the electronics in device package 255. RF antenna 270 has an antenna pattern 272 that does not rotate with the optical FOV 260.

Referring now to FIGS. 9 and 10A-10D, a self-contained quick-mount RF warning receiver 300 includes a single lockable suction cup 302 having a centrally located mechanical ball joint 304 for locking the suction cup to a surface. An RF antenna 306 is positioned inside the single lockable suction cup 302 to receive RF radiation within an antenna pattern 308. Typical suction cups are large enough to accommodate patch antenna sizes that span from the L to Ka bands. RF antenna 306 is electrically coupled to a warning receiver 310 suitably attached to the mechanical ball joint 304, which contains the RF electronics or common optical back end and the HMIF. The antenna pattern 308 can be rotated by rotating the entire device before it is locked to a window 312. But once its locked, there is no mechanical means to point antenna pattern 308. Indicia may be provided on the device to tell the pilot or occupant "this end up" to point the antenna pattern in a preferred direction.

Figure 10A:
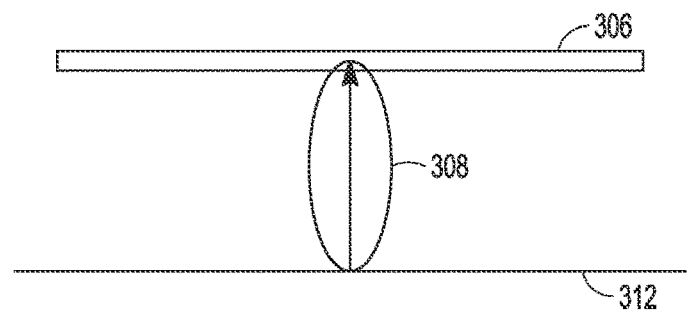

As shown in FIG. 10A, RF antenna 306 can be positioned inside single lockable suction cup 302 such that antenna pattern 308 is normal to window 312. This may be achieved, for example, by forming RF antenna 306 on a rigid platform that is centrally located within the single lockable suction cup.

Figure 10B:
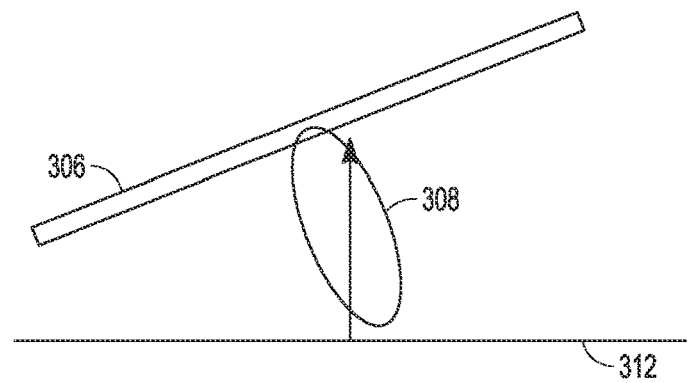

As shown in FIG. 10B, RF antenna 306 can be positioned inside single lockable suction cup 302 such that antenna pattern 308 is biased at an angle to the surface normal to window 312. This may be achieved, for example, by forming RF antenna 306 on a rigid platform that is centrally located within the single lockable suction cup and tipped at the desired angle or by forming the RF antenna 306 in or on a portion of the suction cup such that once locked the RF antenna 306 is biased at the desired angle.

Figure 10C:
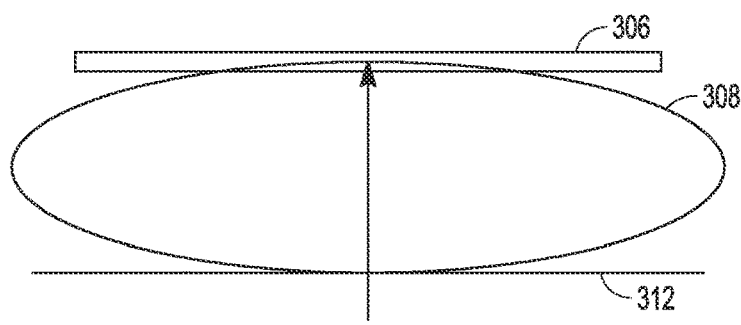

As shown in FIG. 10C, RF antenna 306 is configured as in FIG. 10A with the antenna pattern 308 normal to window 310 but the antenna pattern 308 has minimal directivity or gain but very wide coverage.

Figure 10D:
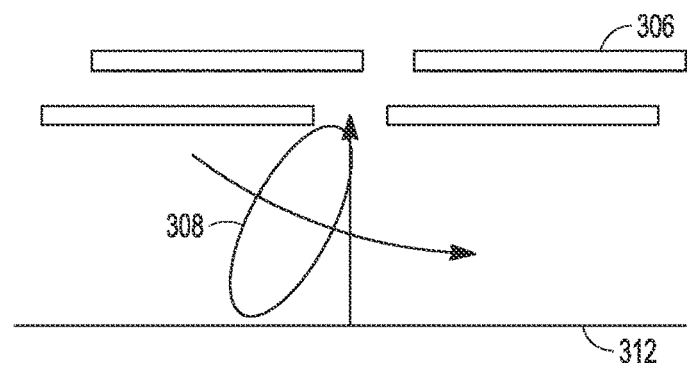

As shown in FIG. 10D, RF antenna 306 is partitioned into multiple segments and electronically controlled to point the antenna pattern 308.

Figure 11:
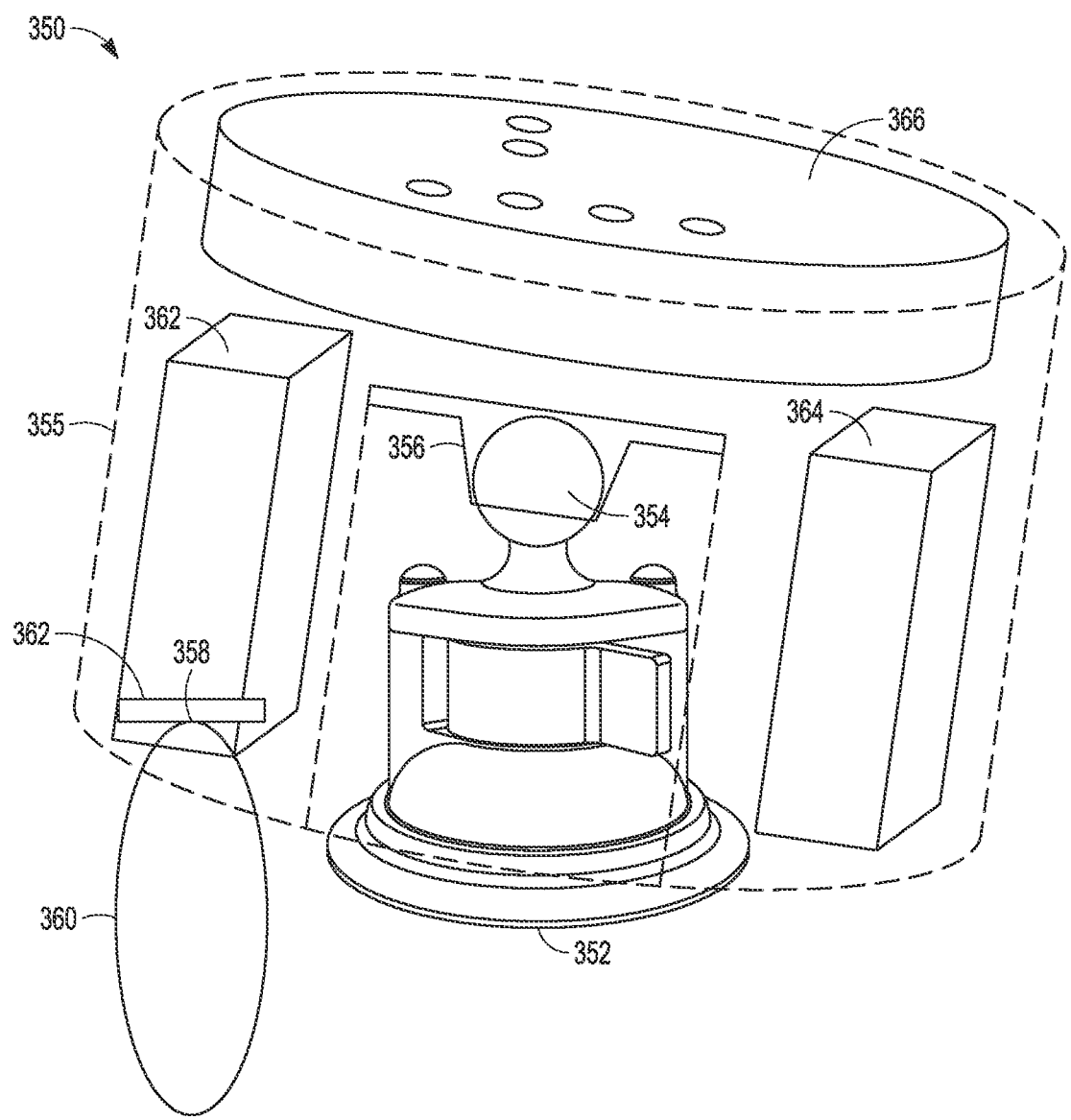
FIG. 11 illustrates an embodiment in which the quick-mount release mechanism includes a single suction cup foot having a mechanical ball joint on which the RF warning receiver is rotatably coupled.

Referring now to FIG. 11, a self-contained quick-mount RF warning receiver 350 includes a single lockable suction cup 352 having a centrally located mechanical ball joint 354. A device package 355 includes a ball joint interface 356 that engages mechanical ball joint 354. The warning receiver's RF antenna 358 is offset and positioned outside the footprint of the single lockable suction cup 352. The RF antenna's antenna pattern 360 can be rotated about the axis through the suction cup (the Z-axis) or about the X and Y axes. Within device package 355, the RF electronics/optical backend 362 is suitably offset with the RF 358 and the battery 364 is offset in the other direction to provide balance. The electronics and HMIF 366 are mounted on the rear facing side of the ball joint interface 356. The exact locations of the battery 364, electronics within the HMIF 366, and RF electronics or optical backend 362 can be moved to balance the system and fit necessary components within the device package 355.

While several illustrative embodiments of the disclosure have been shown and described, numerous variations and alternate embodiments will occur to those skilled in the art. Such variations and alternate embodiments are contemplated, and can be made without departing from the spirit and scope of the disclosure as defined in the appended claims.

I claim:

1. A self-contained quick-mount RF/laser warning receiver, comprising:
   a warning receiver including a forward-facing aperture having a field-of-view (FOV), an optical detector and a forward-facing RF antenna having an antenna pattern and a rearward-facing human-machine interface (HMIF); and
   a quick release mechanism for mounting the warning receiver to a flat or curved inner surface of an optically and RF transparent window of a manned platform to position the forward-facing aperture and RF antenna to receive light within the FOV and RF within the antenna pattern through the optically and RF transparent window and to provide visual or audio warnings via the HMIF of a detected laser or RF source to a human occupant;
   wherein the warning receiver includes optics that couple received light within the FOV to a pixelated optical detector to generate a first electrical signal, a seed laser configured to produce an optical beam, an electro-optic (EO) modulator configured to modulate the optical beam with the received RF, one or more pixels of the optical detector configured to sense the modulated optical beam and generate a second electrical signal, and EO electronics configured to process the first electrical signal to detect the laser source and to process one or more samples of the second electrical signal to detect the RF source.

2. The self-contained quick-mount RF/laser warning receiver of claim 1, wherein the warning receiver is configured to detect continuous wave (CW) or pulsed laser sources in the visible or NIR/SWIR bands and pulsed RF sources.

3. The self-contained quick-mount RF/laser warning receiver of claim 1, wherein the quick release mechanism includes two or more feet coupled to a stationary device platform on which the warning receiver is mounted.

4. The self-contained quick-mount RF/laser warning receiver of claim 3, wherein the RF antenna is configured such that its antenna pattern is coincident with a surface normal to the window.

5. The self-contained quick-mount RF/laser warning receiver of claim 3, wherein the RF antenna is configured such that its antenna pattern is biased at an angle to a surface normal to the window.

6. The self-contained quick-mount RF/laser warning receiver of claim 3, wherein the RF antenna comprises an array of electronically-controlled antenna elements to point the antenna pattern at an angle to a surface normal to the window.

7. A self-contained quick-mount RF/laser warning receiver, comprising:
  a warning receiver including a forward-facing aperture having a field-of-view (FOV), an optical detector and a forward-facing RF antenna having an antenna pattern and a rearward-facing human-machine interface (HMIF); and
  a quick release mechanism includes two or more feet coupled to a stationary device platform for mounting the warning receiver to a flat or curved inner surface of an optically and RF transparent window of a manned platform to position the forward-facing aperture and RF antenna to receive light within the FOV and RF within the antenna pattern through the optically and RF transparent window and to provide visual or audio warnings via the HMIF of a detected laser or RF source to the human occupant,
  wherein the stationary device platform is formed with locking features, wherein the warning receiver is formed with complementary locking features that allow the warning receiver to be lifted, rotated about a surface normal to the window and re-engaged with the locking features on the stationary device platform to cylindrically rotate the FOV and antenna pattern.

8. The self-contained quick-mount RF/laser warning receiver of claim 1, wherein the quick release mechanism further comprises a rotation coupler configured to manually rotate the FOV and antenna pattern in a full 3-axis of rotation.

9. A self-contained quick-mount RF/laser warning receiver, comprising:
  a warning receiver including a forward-facing aperture having a field-of-view (FOV), an optical detector and a forward-facing RF antenna having an antenna pattern and a rearward-facing human-machine interface (HMIF); and
  a quick release mechanism for mounting the warning receiver to a flat or curved inner surface of an optically and RF transparent window of a manned platform to position the forward-facing aperture and RF antenna to receive light within the FOV and RF within the antenna pattern through the optically and RF transparent window and to provide visual or audio warnings via the HMIF of a detected laser or RF source to the human occupant,
  wherein the quick release mechanism includes at least two feet rotatably coupled to a stationary device platform including a ball joint interface for mounting on the inner surface of the optically and RF transparent window and an optical ball joint that engages the ball joint interface, wherein the optical ball joint rigidly and optically couples the forward-facing aperture to the optical detector to rotate the FOV in three axes, wherein the RF antenna is positioned outside the optical path to the optical detector so that the antenna pattern rotates with the FOV in three axes.

10. A self-contained quick-mount RF/laser warning receiver, comprising:
  a warning receiver including a forward-facing aperture having a field-of-view (FOV), an optical detector and a forward-facing RF antenna having an antenna pattern and a rearward-facing human-machine interface (HMIF); and
  a quick release mechanism for mounting the warning receiver to a flat or curved inner surface of an optically and RF transparent window of a manned platform to position the forward-facing aperture and RF antenna to receive light within the FOV and RF within the antenna pattern through the optically and RF transparent window and to provide visual or audio warnings via the HMIF of a detected laser or RF source to the human occupant,
  wherein the quick release mechanism comprises includes at least two feet rotatably coupled to a stationary device platform including a ball joint interface for mounting on the inner surface of the optically and RF transparent window and an optical ball joint that engages the ball joint interface, wherein the optical ball joint rigidly and optically couples the forward-facing aperture to the optical detector to rotate the FOV in three axes, wherein the RF antenna comprises a conductive optically transparent coating on the optical ball joint such that the antenna pattern rotates with the FOV in three axes.

11. A self-contained quick-mount RF/laser warning receiver, comprising:
  a warning receiver including a forward-facing aperture having a field-of-view (FOV), an optical detector and a forward-facing RF antenna having an antenna pattern and a rearward-facing human-machine interface (HMIF); and
  a quick release mechanism for mounting the warning receiver to a flat or curved inner surface of an optically and RF transparent window of a manned platform to position the forward-facing aperture and RF antenna to receive light within the FOV and RF within the antenna pattern through the optically and RF transparent window and to provide visual or audio warnings via the HMIF of a detected laser or RF source to the human occupant,
  wherein the quick release mechanism includes a single suction cup including a mechanical ball joint that engages a ball joint interface on the warning receiver, wherein the RF antenna is positioned inside the single suction cup, wherein the forward-facing aperture is positioned outside the single suction cup to rotate the FOV in three axes.

12. The self-contained quick-mount RF/laser warning receiver of claim 1, wherein the quick release mechanism includes a single suction cup including a rotatable mount with a cantilever arm attached to the warning receiver to point the FOV and the antenna pattern.

13. A self-contained quick-mount RF warning receiver, comprising:

a warning receiver including a forward-facing RF antenna having an antenna pattern and a rearward-facing human-machine interface (HMIF); and a quick release mechanism including a single lockable suction cup for mounting the warning receiver to a flat or curved inner surface of an RF transparent window of a manned platform, wherein the forward-facing RF antenna is positioned within the single lockable suction cup to receive RF within the antenna pattern through the RF transparent window and to provide visual or audio warnings via the HMIF of a detected RF source to a human occupant.

14. The self-contained quick-mount RF warning receiver of claim 13, wherein the RF antenna is configured such that its antenna pattern is biased at an angle to a surface normal to the window.

15. The self-contained quick-mount RF warning receiver of claim 14, wherein the RF antenna comprises an array of electronically-controlled antenna elements to point the antenna pattern at the angle.

16. A self-contained quick-mount RF warning receiver, comprising:

a warning receiver including a forward-facing RF antenna configured to receive RF within an antenna pattern in an RF band between the L and Ka bands and a rearward-facing human-machine interface (HMIF); and a quick release mechanism for mounting the warning receiver to a flat or curved inner surface of an RF transparent window of a manned platform to position the forward-facing RF antenna to receive RF within the antenna pattern through the RF transparent window and to provide visual or audio warnings via the HMIF of a detected RF source to a human occupant, wherein the warning receiver includes a seed laser configured to produce an optical beam, an electro-optic (EO) modulator configured to modulate the optical beam with the received RF, an optical detector configured to sense the modulated optical beam and generate a temporal electrical signal, and EO electronics configured to process one or more samples of the temporal electrical signal to detect the RF source, wherein the warning receiver spans the bandwidth between the L and Ka bands.

17. The self-contained quick-mount RF warning receiver of claim 16, wherein the RF antenna comprises an array of electronically-controlled antenna elements to point the antenna pattern at an angle to a surface normal to the window.

18. The self-contained quick-mount RF warning receiver of claim 16, wherein the quick release mechanism includes a single suction cup including a mechanical ball joint that engages a ball joint interface on the warning receiver, wherein the RF antenna is positioned outside the single suction cup to rotate the antenna pattern in three axes.

19. The self-contained quick-mount RF warning receiver of claim 16, wherein the quick release mechanism comprises includes at least two feet rotatably coupled to a stationary device platform including a ball joint interface for mounting on the inner surface of the RF transparent window and an RF transparent ball joint that engages the ball joint interface, wherein the ball joint rotates the antenna pattern in three axes.

* * * * *

UNITED STATES PATENT AND TRADEMARK OFFICE
CERTIFICATE OF CORRECTION

PATENT NO. : 12,456,379 B2  
APPLICATION NO. : 18/074164  
DATED : October 28, 2025  
INVENTOR(S) : Sean D. Keller Page 1 of 1

It is certified that error appears in the above-identified patent and that said Letters Patent is hereby corrected as shown below:

In the Specification

In Column 2, Line 43, delete "which." and insert --which:-- therefor

In Column 5, Line 14, after "location", insert --.--

Signed and Sealed this  
Twenty-seventh Day of January, 2026

John A. Squires  
*Director of the United States Patent and Trademark Office*